United States Patent
Bergström et al.

(10) Patent No.: US 12,309,873 B2
(45) Date of Patent: May 20, 2025

(54) MULTI-SIM DYNAMIC CAPABILITIES

(71) Applicant: Telefonaktiebolaget LM Ericsson (publ), Stockholm (SE)

(72) Inventors: Mattias Bergström, Sollentuna (SE); Christofer Lindheimer, Vadstena (SE); Magnus Stattin, Upplands Väsby (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 17/774,228

(22) PCT Filed: Nov. 3, 2020

(86) PCT No.: PCT/IB2020/060327
§ 371 (c)(1),
(2) Date: May 4, 2022

(87) PCT Pub. No.: WO2021/090179
PCT Pub. Date: May 14, 2021

(65) Prior Publication Data
US 2022/0408518 A1      Dec. 22, 2022

Related U.S. Application Data

(60) Provisional application No. 62/930,261, filed on Nov. 4, 2019.

(51) Int. Cl.
*H04W 60/00*          (2009.01)
*H04W 8/24*           (2009.01)
(Continued)

(52) U.S. Cl.
CPC .............. *H04W 76/30* (2018.02); *H04W 8/24* (2013.01); *H04W 60/005* (2013.01); *H04W 76/15* (2018.02); *H04W 88/06* (2013.01)

(58) Field of Classification Search
CPC ... H04W 60/005; H04W 76/15; H04W 76/16; H04W 76/30; H04W 8/183; H04W 8/24; H04W 88/06
(Continued)

(56) References Cited

U.S. PATENT DOCUMENTS

2013/0053044 A1*   2/2013  Davies ................... H04W 8/18
                                              455/438
2017/0127217 A1    5/2017  Miao et al.
(Continued)

FOREIGN PATENT DOCUMENTS

WO      2015180779 A1    12/2015
WO      2021038443 A1     3/2021

OTHER PUBLICATIONS

Examination Report for Indian Patent Application No. 202217027455, mailed Sep. 13, 2022, 6 pages.
(Continued)

*Primary Examiner* — Robert J Lopata
(74) *Attorney, Agent, or Firm* — Withrow & Terranova, PLLC

(57) ABSTRACT

Systems and methods are disclosed herein related simultaneous registration of wireless communication device having multiple Subscriber Identity Modules (SIMs) with two or more networks. In one embodiment, a method performed by a wireless communication device having multiple SIMs comprises registering with a first network associated with a first SIM and registering with a second network associated with a second SIM such that the wireless communication device is simultaneously registered with both the first network and the second network. The method further comprises providing, to a network node associated with the first network, capability information for the wireless communication device that indicates less than full capabilities of the wireless communication device. In this manner, the wireless (Continued)

communication device ensures that it will have sufficient resources to maintain simultaneous connections to both the first and second network.

18 Claims, 7 Drawing Sheets

(51) Int. Cl.
   *H04W 76/15* (2018.01)
   *H04W 76/30* (2018.01)
   *H04W 88/06* (2009.01)
(58) Field of Classification Search
   USPC .......................................................... 370/329
   See application file for complete search history.

(56) References Cited

U.S. PATENT DOCUMENTS

| | | | | |
|---|---|---|---|---|
| 2017/0171902 | A1* | 6/2017 | Tillman | H04W 76/16 |
| 2018/0213576 | A1 | 7/2018 | Koskinen | |
| 2019/0069193 | A1* | 2/2019 | Astrom | H04W 52/028 |
| 2019/0223033 | A1* | 7/2019 | Nam | H04B 7/0805 |
| 2021/0014934 | A1* | 1/2021 | Lovlekar | H04W 88/04 |
| 2021/0022209 | A1* | 1/2021 | Singh | H04L 43/16 |
| 2021/0345097 | A1* | 11/2021 | Wu | H04W 76/15 |
| 2021/0345209 | A1* | 11/2021 | Wu | H04W 36/16 |
| 2022/0159607 | A1* | 5/2022 | Singh | H04W 60/005 |
| 2022/0191696 | A1* | 6/2022 | Yoshizawa | H04L 9/3213 |
| 2022/0210764 | A1* | 6/2022 | Hong | H04W 68/005 |
| 2022/0256328 | A1* | 8/2022 | Xie | H04W 8/24 |
| 2022/0312538 | A1* | 9/2022 | Zhang | H04W 68/005 |
| 2022/0361058 | A1* | 11/2022 | Shaheen | H04W 36/06 |
| 2023/0189209 | A1* | 6/2023 | Jung | H04W 48/12 370/329 |
| 2024/0197942 | A1* | 6/2024 | Lovlekar | G05D 1/0094 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.7.0, Sep. 2019, 3GPP Organizational Partners, 962 pages.

Author Unknown, "Technical Specification Group Radio Access Network; NR; Radio Resource Control (RRC) protocol specification (Release 15)," Technical Specification 38.331, Version 15.7.0, Sep. 2019, 3GPP Organizational Partners, 527 pages.

Nokia, et al., "R2-1709212: Recap of intended UE assistance to diminish thermal issues," 3GPP TSG-RAN WG2 #99, Aug. 21-25, 2017, Berlin, Germany, 5 pages.

Qualcomm Incorporated, "R2-1708978: Ue overheating problem," 3GPP TSG-RAN WG2 Meeting #99, Aug. 21-25, 2017, Berlin, Germany, 5 pages.

Qualcomm Incorporated, "R2-1803617: Extending LTE Overheating mechanism to NR," 3GPP TSG-RAN WG2 #101, Feb. 26-Mar. 2, 2018, Athens, Greece, 4 pages.

Qualcomm Incorporated, "R2-1811129: Temporary Capability Restriction for standalone NR," 3GPP TSG-RAN WG2 Meeting #1807, Aug. 20-24, 2018, Gothenburg, Sweden, 4 pages.

Qualcomm Incorporated, "RP-160269: New WI Proposal: Multi-Profile UE E-UTRA capability for LTE," 3GPP TSG RAN Meeting #71, Mar. 7-10, 2016, Gothenburg, Sweden, 6 pages.

Qualcomm Incorporated, "RP-160270: Motivation for RAN2 Rel-14 WI Proposal on Multi-profile UE capability for LTE," 3GPP RAN #71, Mar. 7-10, 2016, Gothenburg, Sweden, 6 pages.

International Search Report and Written Opinion for International Patent Application No. PCT/IB2020/060327, mailed Feb. 5, 2021, 23 pages.

* cited by examiner

MULTI-SIM DYNAMIC CAPABILITIES

RELATED APPLICATIONS

This application is a 35 U.S.C. § 371 national phase filing of International Application No. PCT/IB2020/060327, filed Nov. 3, 2020, which claims the benefit of provisional patent application Ser. No. 62/930,261, filed Nov. 4, 2019, the disclosures of which are hereby incorporated herein by reference in their entireties.

TECHNICAL FIELD

The present disclosure relates to wireless communication and more particularly, User Equipment (UE) and network functionality used when serving so-called "Multi-SIM" devices/UEs.

BACKGROUND

Multiple Subscriber Identity Module (SIM), or "Multi-SIM," devices are devices which enable use of multiple subscriptions in one device by means of more than one Universal Mobile Telecommunications System (UMTS) SIM (USIM). Multi-SIM UE's can support concurrent registration to more than one network simultaneously and, e.g., if a UE has two different radios implemented, such as both dual receive (Rx) and dual transmit (Tx) capability, it would be possible for the UE to behave as two separate UEs and communicate with two networks at the same time.

There are also dual or multi-SIM capable UEs that only have one single radio front-end and baseband processing. In this case, if such a UE is registered to two different Public Land Mobile Networks (PLMNs), it is challenging to manage all situations that may occur. For example, it is challenging to manage simultaneous communication with both systems and communication in one system while the other system wants to reach the UE with pages.

An additional aspect of being paged, potentially in two systems, or being occupied in one system while being paged from the other system is that even if it would be possible to listen to pages from one system while communicating in the other system, or if it would be possible to receive pages from two systems simultaneously, there would need to be enough information provided to the end-user/user of the UE to be able to select what communication to prioritize, unless both are not possible at the same time.

There currently exist certain challenge(s). Multi-SIM UE's have been around for some time, but the technical support for the above situations have been such that there is nothing really standardized. Rather, these Multi-SIM UEs may be violating the standard by, e.g., simply leaving a conversation or a connection in case it prioritizes another or not tuning to receive pages from one of the systems. As a result, the network may continue to schedule data to a UE that is no longer able to receive, which in turn deteriorates network performance.

Further, with the increase in number of situations when a user may have a work-SIM and a private-SIM, the amount of Multi-SIM UE's is increasing. There is also a trend to "Bring Your Own Device" to work (BYOD). In such situations, the work may only provide a SIM instead of doubling the amount of UE's in the world. Another trend is that a user may join a "family plan" subscription while maintaining the user's old subscription, resulting in the user having two personal subscriptions/SIMs.

With this increase in Dual-SIM or even Multi-SIM UE related needs, it would be advantageous if there were robust solutions supported by the Third Generation Partnership (3GPP) standard, solutions that avoid a negative impact to network performance and also offer a better service/user experience are needed.

SUMMARY

Systems and methods are disclosed herein related simultaneous registration of wireless communication device having multiple Subscriber Identity Modules (SIMs) with two or more networks. In one embodiment, a method performed by a wireless communication device having multiple SIMs comprises registering with a first network associated with a first SIM and registering with a second network associated with a second SIM such that the wireless communication device is simultaneously registered with both the first network and the second network. The method further comprises providing, to a network node associated with the first network, capability information for the wireless communication device that indicates less than full capabilities of the wireless communication device. In this manner, the wireless communication device ensures that it will have sufficient resources to maintain simultaneous connections to both the first and second network.

In one embodiment, the capability information provide to the network node associated with the first network takes into consideration resources that are or may be needed for communication on the second network such that the capability information indicates less than full capabilities of the wireless communication device.

In one embodiment, the capability information comprises information that indicates: (a) a number of carriers supported by the wireless communication device, (b) one or more carrier combinations supported by the wireless communication device, (c) one or more processing capabilities of the wireless communication device, (d) one or more features supported by the wireless communication device, (e) a number of radio frontends that the wireless communication device has, (f) a bandwidth supported by the wireless communication device, (g) a buffer or memory size supported by the wireless communication device, (h) a number of PDN connections or PDU connections supported by the wireless communication device, (i) one or more carrier aggregation related capabilities of the wireless communication device, (j) one or more dual connectivity related capabilities of the wireless communication device, (k) any two or more of (a)-(j).

In one embodiment, the method further comprises obtaining a configuration of: (i) one or more services for which the first network is to be used by the wireless communication device, (ii) one or more services for which the second network is to be used by the wireless communication device, or (iii) both (i) and (ii). Further, the capability information provided to the network node associated with the first network takes into consideration the one or more services for which the first network is to be used by the wireless communication device, the one or more services for which the second network is to be used by the wireless communication device, or both the one or more services for which the first network is to be used by the wireless communication device and the one or more services for which the second network is to be used by the wireless communication device.

In one embodiment, the first network and the second network are different networks. In another embodiment, the first network and the second network are the same network.

In one embodiment, the first network is a first Public Land Mobile Network (PLMN), and the second network is a second PLMN.

Corresponding embodiments of a wireless communication device are also disclosed. In one embodiment, a wireless communication device having multiple SIMs is adapted to register with a first network associated with a first SIM and register with a second network associated with a second SIM such that the wireless communication device is simultaneously registered with both the first network and the second network. The wireless communication device is further adapted to provide, to a network node associated with the first network, capability information for the wireless communication device that indicates less than full capabilities of the wireless communication device.

In one embodiment, a wireless communication device having multiple SIMs comprises one or more transmitters, one or more receivers, and processing circuitry associated with the one or more transmitters and the one or more receivers. The processing circuitry is configured to cause the wireless communication device to register with a first network associated with a first SIM and register with a second network associated with a second SIM such that the wireless communication device is simultaneously registered with both the first network and the second network. The processing circuitry is further configured to cause the wireless communication device to provide, to a network node associated with the first network, capability information for the wireless communication device that indicates less than full capabilities of the wireless communication device.

In another embodiment, a method performed by a wireless communication device comprises providing, to a network node associated with a first network, two or more capability profiles for the wireless communication device. The method further comprises providing, to the network node, an indication to use a particular one of the two or more capability profiles for the wireless communication device.

In one embodiment, providing the two or more capability profiles to the network node comprises providing the two or more capability profiles to the network node via a same message. In another embodiment, providing the two or more capability profiles to the network node comprises providing the two or more capability profiles to the network node via separate messages.

In one embodiment, providing the two or more capability profiles to the network node comprises providing a first capability profile of the wireless communication device to the network node together with an indication that one or more additional capability profiles for the wireless communication device are available, receiving a request from the network node for at least one of the one or more additional capability profiles for the wireless communication device, and providing the at least one of the one or more additional capability profiles for the wireless communication device to the network node in response to the request.

In one embodiment, the method further comprises receiving an indication that the wireless communication device is allowed to provide multiple capability profiles to the network.

In one embodiment, the method further comprises deciding to use the particular one of the two or more capability profiles for the wireless communication device. Further, providing the indication to use the particular one of the two or more capability profiles for the wireless communication device comprises providing the indication to use the particular one of the two or more capability profiles for the wireless communication device upon deciding to use the particular one of the two or more capability profiles for the wireless communication device.

In one embodiment, the indication is an overheat indication.

In one embodiment, the two or more capability profiles comprises a first capability profile and a second capability profile, the second capability profile being indicative of reduced capabilities as compared to the first capability profile.

In one embodiment, each capability profile of the two or more capability profiles comprises information that indicates: (a) a number of carriers supported by the wireless communication device, (b) one or more carrier combinations supported by the wireless communication device, (c) one or more processing capabilities of the wireless communication device, (d) one or more features supported by the wireless communication device, (e) a number of radio frontends that the wireless communication device has, (f) a bandwidth supported by the wireless communication device, (g) a buffer or memory size supported by the wireless communication device, (h) a number of PDN connections or PDU connections supported by the wireless communication device (i), one or more carrier aggregation related capabilities of the wireless communication device, (j) one or more dual connectivity related capabilities of the wireless communication device, or (k) any two or more of (a)-(j).

In one embodiment, the wireless communication device has multiple SIMs.

Corresponding embodiments of a wireless communication device are also disclosed. In one embodiment, a wireless communication device is adapted to provide, to a network node associated with a first network, two or more capability profiles for the wireless communication device and provide, to the network node, an indication to use a particular one of the two or more capability profiles for the wireless communication device.

In one embodiment, a wireless communication device comprises one or more transmitters, one or more receivers, and processing circuitry associated with the one or more transmitters and the one or more receivers. The processing circuitry is configured to cause the wireless communication device to provide, to a network node associated with a first network, two or more capability profiles for the wireless communication device and provide, to the network node, an indication to use a particular one of the two or more capability profiles for the wireless communication device.

In another embodiment, a method performed by a wireless communication device that is simultaneously registered with a first network and a second network, in connected mode with respect to the first network and in idle or inactive mode with respect to the second network, comprises determining that the wireless communication device is to connect to the second network and sending, to a network node associated with the first network, a request or suggestion to release a connection of the wireless communication device with the first network. The method further comprises receiving, from the network node associated with the first network, a request to release the connection of the wireless communication device with the first network. The method further comprises reconnecting with the first network and providing, to a network node associated with the first network, capability information that takes into consideration resources to be used for a connection with the second network.

In one embodiment, the request or suggestion to release the connection comprises release assistance information. In one embodiment, the release assistance information comprises an indication that the wireless communication device intends to change its capabilities upon reconnecting to the first network.

In one embodiment, the first network is a first PLMN associated with a first SIM of the wireless communication device, and the second network is a second PLMN associated with a second SIM of the wireless communication device.

Corresponding embodiments of a wireless communication device are also disclosed. In one embodiment, a wireless communication device adapted to, when simultaneously registered with a first network and a second network, in connected mode with respect to the first network and in idle or inactive mode with respect to the second network, determine that the wireless communication device is to connect to the second network. The wireless communication device is further adapted to send, to a network node associated with the first network, a request or suggestion to release a connection of the wireless communication device with the first network. The wireless communication device is further adapted to receive, from the network node associated with the first network, a request to release the connection of the wireless communication device with the first network. The wireless communication device is further adapted to reconnect with the first network and provide, to a network node associated with the first network, capability information that takes into consideration resources to be used for a connection with the second network.

In one embodiment, a wireless communication device comprises one or more transmitters, one or more receivers, and processing circuitry associated with the one or more transmitters and the one or more receivers. The processing circuitry is configured to cause the wireless communication device to, when simultaneously registered with a first network and a second network, in connected mode with respect to the first network and in idle or inactive mode with respect to the second network, determine that the wireless communication device is to connect to the second network. The processing circuitry is further configured to cause the wireless communication device to send, to a network node associated with the first network, a request or suggestion to release a connection of the wireless communication device with the first network. The processing circuitry is further configured to receive, from the network node associated with the first network, a request to release the connection of the wireless communication device with the first network. The processing circuitry is further configured to reconnect with the first network and provide, to a network node associated with the first network, capability information that takes into consideration resources to be used for a connection with the second network.

Embodiments of a method performed by a network node are also disclosed. In one embodiment, a method performed by a network node for a cellular communications system comprises receiving, from a wireless communication device, two or more capability profiles for the wireless communication device. The method further comprises receiving, from the wireless communication device, an indication to use a particular one of the two or more capability profiles for the wireless communication device.

In one embodiment, receiving the two or more capability profiles comprises receiving the two or more capability profiles via a same message. In another embodiment, receiving the two or more capability profiles comprises receiving the two or more capability profiles via separate messages.

In one embodiment, receiving the two or more capability profiles comprises receiving a first capability profile of the wireless communication device together with an indication that one or more additional capability profiles for the wireless communication device are available and sending a request to the wireless communication device for at least one of the one or more additional capability profiles for the wireless communication device, and receiving the at least one of the one or more additional capability profiles for the wireless communication device from the wireless communication device in response to the request.

In one embodiment, the method further comprises providing, to the wireless communication device, an indication that the wireless communication device is allowed to provide multiple capability profiles to the network.

In one embodiment, the method further comprises configuring the wireless communication device in accordance with the particular one of the two or more capability profiles for the wireless communication device.

In one embodiment, the indication is an overheat indication.

In one embodiment, the two or more capability profiles comprises a first capability profile and a second capability profile, the second capability profile being indicative of reduced capabilities as compared to the first capability profile.

In one embodiment, each capability profile of the two or more capability profiles comprises information that indicates: (a) a number of carriers supported by the wireless communication device, (b) one or more carrier combinations supported by the wireless communication device, (c) one or more processing capabilities of the wireless communication device, (d) one or more features supported by the wireless communication device, (e) a number of radio frontends that the wireless communication device has, (f) a bandwidth supported by the wireless communication device, (g) a buffer or memory size supported by the wireless communication device, (h) a number of PDN connections or PDU connections supported by the wireless communication device, (i) one or more carrier aggregation related capabilities of the wireless communication device, (j) one or more dual connectivity related capabilities of the wireless communication device, or (k) any two or more of (a)-(j).

Corresponding embodiments of a network node are also disclosed. In one embodiment, a network node for a cellular communications system is adapted to receive, from a wireless communication device, two or more capability profiles for the wireless communication device and receive, from the wireless communication device, an indication to use a particular one of the two or more capability profiles for the wireless communication device.

In one embodiment, a network node for a cellular communications system comprises processing circuitry configured to cause the network node to receive, from a wireless communication device, two or more capability profiles for the wireless communication device and receive, from the wireless communication device, an indication to use a particular one of the two or more capability profiles for the wireless communication device.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
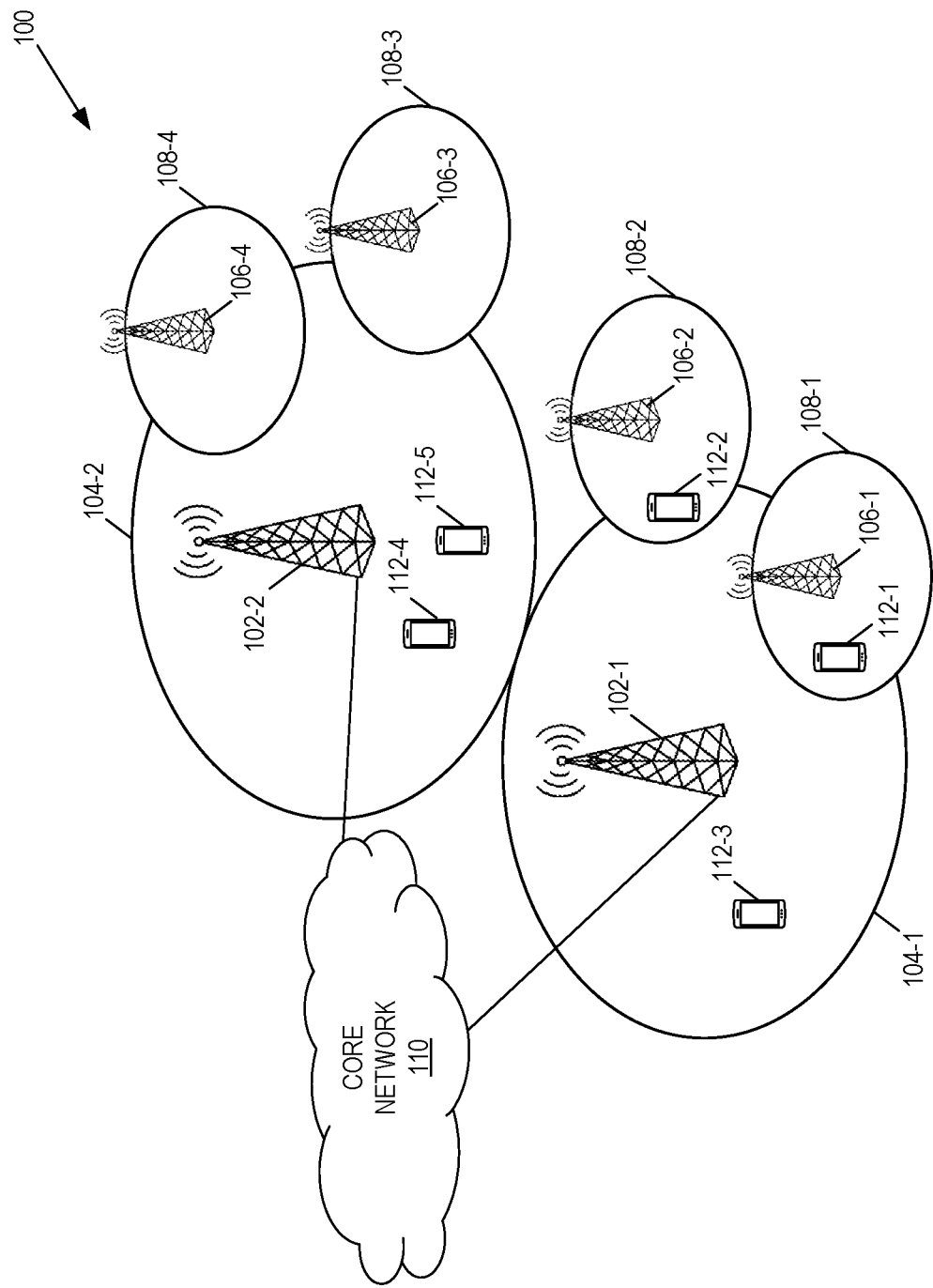
FIG. 1 illustrates an example of a cellular communication system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As discussed above, there has been an increase in Dual-Subscriber Identity Module (SIM) or even Multi-SIM UE related needs, it would be advantageous if there were robust solutions supported by the 3GPP standard. These solutions would avoid a negative impact to network performance and also offer a better service/user experience are needed. To offer such solutions, the following challenges must at least be addressed:

Simultaneous registration to more than one Public Land Mobile Network (PLMN),

Management of paging transmissions from any of the PLMNs in all situations, e.g., UE needs to be able to receive (monitor) for paging when being occupied in connected mode in one PLMN, UE needs to be able to receive paging from both systems, i.e., receive paging from both PLMNs simultaneously, It should be possible to read system information and not miss any warning system broadcasts, It should be possible to perform the necessary measurements, The UE/user needs to be able to prioritize in case of conflicts (e.g., when necessary, to select one communication/page and dismiss/postpone another). This can for example be done if a paging cause is included in the page.

In case the UE switches to another network (if it cannot manage simultaneous communication in two systems), mechanisms are required that allow for a managed/controlled termination of communication in a first network and indicate to the first network preferences on future pages. This can be solved by a mechanism for suspension/or release and resumption of an ongoing connection in one network, such that UE can leave the network and return in a controlled manner.

The above should be possible for different UE types, e.g., UEs with one receiver and one transmitter as well as UEs with two receivers and two transmitters and two receivers and one transmitter, irrespective of what operator/PLMN is involved.

Certain aspects of the present disclosure and their embodiments may provide solutions to the aforementioned or other challenges. In some embodiments, a UE indicates reduced capabilities to the network associated with a first SIM so that the UE can communicate with a second network using spare capabilities.

In one embodiment, the UE indicates reduced capabilities to a first network with an overheating indication that the UE prefers or requires that the first network configures fewer carriers for the UE, so that if the network follows the UE preference or requirement, the UE can use the freed up resources for communication with another network.

In one embodiment, the UE requests a first network to release the connection with the UE. The UE changes its capabilities with respect to that network so that resources or capabilities can be used for communication with another network.

In one embodiment, the UE indicates two capability sets where different capabilities apply for when the UE is operating only using one SIM and different capabilities apply for when the UE operates using two SIMs.

Certain embodiments may provide one or more of the following technical advantage(s). Embodiments disclosed herein may enable a UE to use simultaneous connections using different SIMs.

FIG. 1 illustrates one example of a cellular communications system 100 in which embodiments of the present disclosure may be implemented. In the embodiments described herein, the cellular communications system 100 is a 5G system (5GS) including a NR RAN or LTE RAN (i.e., E-UTRA RAN) or an Evolved Packet System (EPS) including a LTE RAN. In this example, the RAN includes base stations 102-1 and 102-2, which in LTE are referred to as eNBs (when connected to EPC) and in 5G NR are referred to as gNBs or ng-eNBs (e.g., LTE RAN nodes connected to 5GC are referred to as gn-eNBs), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G core (5GC). The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs and as such referred to as UEs 112, but the present disclosure is not limited thereto.

Different methods which a UE 112 may apply when operating in a multi-SIM scenario are described below. In some descriptions herein, an example in which the UE 112 has two SIMs is used; however, the methods can be generalized to also apply to scenarios in which the UE 112 has more than two SIMs and the person skilled in the art will appreciate how the methods would be performed in scenarios with more than two SIMs.

A UE 112 may have multiple SIMs. One use case for multiple SIMs is that the different SIMs are associated with different PLMNs. However, it is also possible that a UE 112 has more than one SIM which is associated with the same PLMN, e.g. a UE 112 has two SIMs from the same operator. It will in some descriptions of the methods herein be used as example that the multiple SIMs are associated to different PLMNs, but the methods can also be applied for the scenario where multiple SIMs are associated with the same PLMN.

It will be described how UE capabilities may be handled in multi-SIM scenarios. Example capability/-ies which may be affected may comprise and/or relate to, e.g., number of radio frontends, number of carriers, bandwidth, buffer sizes/memories, soft-buffer sizes/memories, processing capacity, number of Packet Data Network (PDN) connections/Protocol Data Unit (PDU) sessions, number and/or types of bearers/flows, and/or Dual/Multi-Connectivity and/or Carrier Aggregation (CA) capabilities. CA capabilities and other capabilities may be the same or different for uplink and downlink, respectively. Embodiments of the present disclosure will particularly address the aspect of multi-SIM that relates to simultaneous communication with two networks at the same time. For example, the UE 112 may be in RRC-_CONNECTED with both networks and, e.g., engage in Internet Protocol (IP) Multimedia Subsystem (IMS) voice communication through one network/PLMN, while having data transfer in the other network. This is possible if a UE is equipped with enough receive and transmit resources, (e.g., two receivers Rx/two transmitters). However, sometimes, in particular for multi-carrier operation (e.g., Dual-Connectivity (DC) and CA configurations), even a single network may configure a UE 112 to utilize two receiver chains and two transmitter chains. If a multi-SIM UE 112 is registered with two networks at the same time, it may not always be good to allow for such multi-carrier operation.

Thus, according to one aspect of the present disclosure, a multi-SIM capable UE 112 has the capability to communicate with two different PLMNs simultaneously. When the UE 112 is registered in a first PLMN (PLMN1) only (i.e., the UE 112 needs only to receive/transmit signals with PLMN1), the UE 112 provides capability information to PLMN1 that corresponds to a situation when the UE 112 is only using one of the SIMs. This means that it corresponds to a single-SIM UE and all capabilities that are available in the UE 112 (e.g., frequencies, carrier combinations, features, processing) are available for use with PLMN1. When the UE 112 is registered with PLMN1 and a second PLMN (PLMN2) at the same time, the UE 112 provides capabilities to PLMN1 that take into consideration that PLMN2 may also require, e.g., processing, features, in any situation when simultaneous communication with PLMN1 and PLMN2 is necessary/desired. For example, a multi-carrier-capable UE 112 is registered with two different PLMNs where communication may occur simultaneously with both PLMNs, and the multi-carrier-capable UE 112 does not include in its capability information any multi-carrier capability, or only limited multi-carrier capabilities. This is to avoid that one of the PLMNs may configure the UE 112 such that not enough radio capability in the UE 112 is left for communication with the other PLMN.

Note that, as used herein, the phrase "registered with a PLMN" means that the UE 112 receives and/or transmits signals with that PLMN when in connected mode. However, the UE 112 may also be registered with a PLMN when in idle mode, in which case the UE 112 is at least ready to receive some signals (e.g., paging signals) from that PLMN.

Example implementation: If the UE 112 has the possibility to support up to six carriers in total, the UE 112 would, if it is operating using only a single SIM, indicate in its capabilities that it supports six carriers. Note that the UE 112 indicates the number of carriers in its supported band-combinations. However, if the UE 112 is operating using two SIMs, the UE 112 may indicate to a first PLMN that it supports only three carriers, while indicating to a second PLMN that it supports only three carriers.

A UE 112 may be configured, e.g. by the end user, such that data traffic is preferred or allowed to be communicated only over one SIM, while voice is preferred or allowed to be communicated over another SIM. According to one aspect of the present disclosure, the UE 112 considers the expected services its SIMs are configured to use, when indicating capabilities for the SIMs. For example, the UE 112 indicates multiple carrier operation by the SIM which is expected to serve data traffic, while single carrier operation is indicated by the SIM which should serve voice traffic. The benefit with this is that more resources could be used for the data-SIM and hence high throughputs can be achieved for data communication, while for the voice-SIM only single carrier operation is used, which likely is sufficient for voice communication.

Example implementation: In the example above, it is described how a UE 112 indicates to a first PLMN and to a second PLMN that it supports three carriers. However, if for example the UE 112 is configured to perform voice services over a first PLMN and, e.g., data services over a second PLMN, the UE 112 may indicate to the first PLMN that it supports only one carrier (which should be sufficient to support voice services) and indicate to the second PLMN that it supports five carriers.

Figure 2:
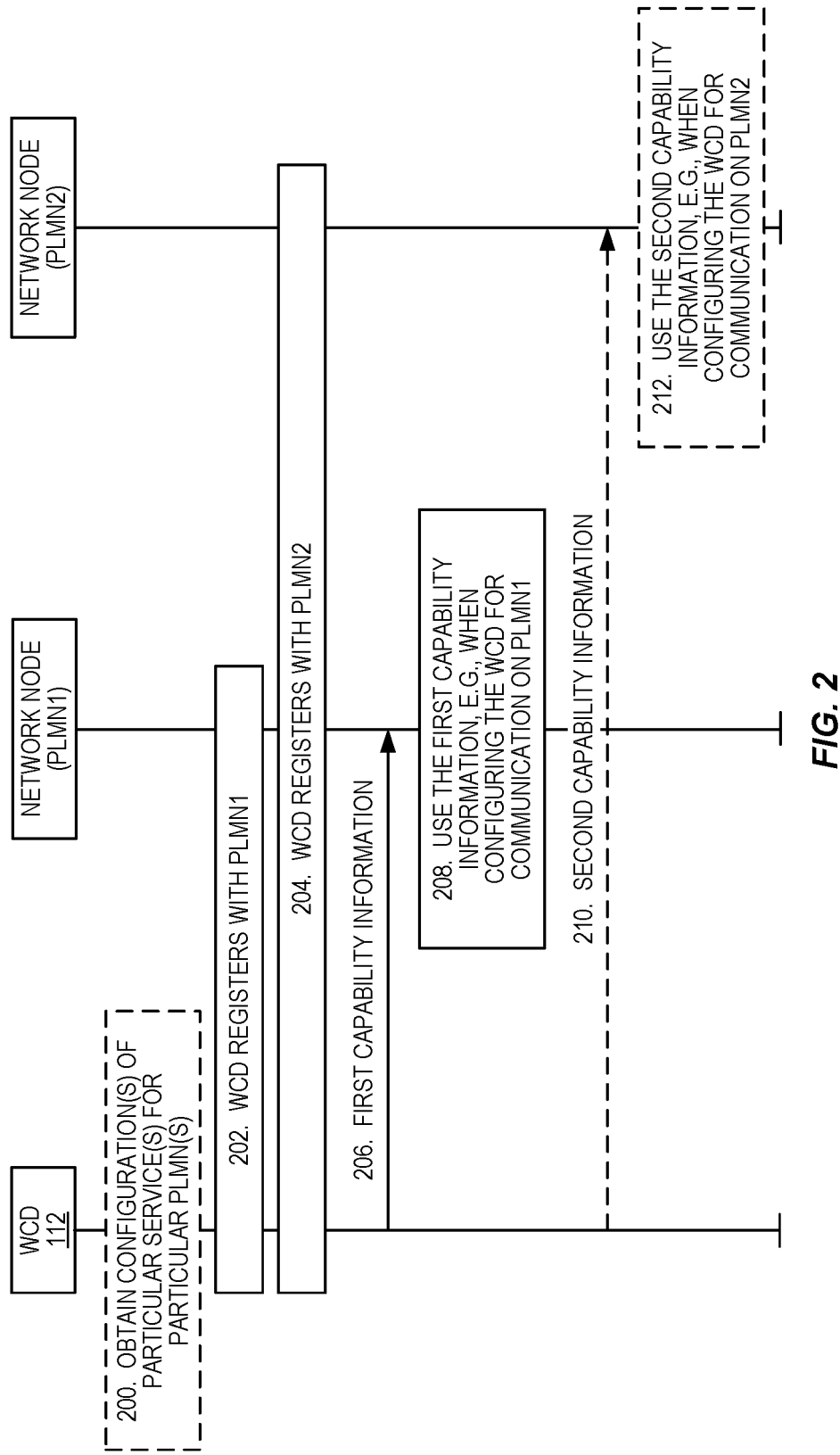
FIG. 2 illustrates the operation of a wireless communication device having multiple Subscriber Indication Modules (SIMs) to provide capability information to network nodes in two Public Land Mobile Networks (PLMNs) to which the wireless communication device has simultaneous registrations in accordance with some embodiments of the present disclosure.

FIG. 2 illustrates the operation of a wireless communication device 112 in accordance with at least some aspects of the embodiments described above. The wireless communication device 112 is equipped with two or more SIMs (e.g., the wireless communication device 112 is a multi-SIM UE). Optional steps are represented by dashed lines/boxes. As illustrated, the wireless communication device 112 optionally obtains a configuration(s) (e.g., from an associated user) of particular service(s) to be used for a particular PLMN(s), as described above (step 200). For example, the wireless communication device 112 may be configured such that a first PLMN (PLMN1) is required or preferred to voice service(s) and a second PLMN (PLMN2) is required or preferred for another service(s) (e.g., a data service(s)).

The wireless communication device 112 registers with PLMN1 and PLMN2, as described above (steps 202 and 204). Thus, the wireless communication device 112 is simultaneously registered with PLMN1, which is associated with a first SIM (SIM1), and with PLMN2, which is associated with PLMN2. The wireless communication device 112 provides, to a network node associated with PLMN1, first capability information (step 206). As described herein, this first capability information takes into consideration that PLMN2 may also require, e.g., processing, features, in any situation when simultaneous communication with PLMN1 and PLMN2 is necessary/desired, as described above. In some embodiments, the first capability information takes into account any service(s) configured as being preferred or required for PLMN1. The network node associated with PLMN1 may then use the first capability information when, e.g., configuring the wireless communication device 112 for communication over PLMN1 (e.g. when deciding whether to configure the wireless communication device 112 with CA or DC), as described above (step 208).

The wireless communication device 112 may also provide, to a network node associated with PLMN2, second capability information that takes into consideration that PLMN1 may also require, e.g., processing, features, in any situation when simultaneous communication with PLMN1 and PLMN2 is necessary/desired, as described above (210). In some embodiments, the second capability information takes into account any service(s) configured as being preferred or required for PLMN2. The network node associated with PLMN2 may then use the second capability information when, e.g., configuring the wireless communication device 112 for communication over PLMN2 (e.g. when deciding whether to configure the wireless communication device 112 with CA or DC), as described above (step 212).

In another aspect of the present disclosure, a UE 112 is signaling at least two different capability information profiles to a network. The at least two different capability information profiles are intended to be used by the receiving network based on indications from the UE 112. In certain situations, a first capability profile will be valid, and the network may configure communication to the UE 112 according to said first capability profile. In another situation, the UE 112 may switch to a second capability profile, at which point the network must re-configure any configuration to the UE 112 that is not coherent with said second capability information. The second capability profile may be used by the UE 112 towards one PLMN when also registered, in idle mode, or in active communication in another PLMN.

Example implementation: To implement this embodiment, when a UE 112 reports its capabilities, the UE 112 may send two occurrences of its UE capabilities. For example, the UE 112 may report two occurrences of its UE capabilities by having two entries in the UE-CapabilityRAT-ContainerList. There may be an implicit mapping such that the first occurrence of a capabilities are mapped to a first index, e.g. 0, and a second occurrence of the capabilities are mapped to a second index, e.g. 1.

```
-- ASN1START
-- TAG-UE-CAPABILITYRAT-CONTAINERLIST-START
UE-CapabilityRAT-ContainerList ::=  SEQUENCE (SIZE (0..maxRAT-
CapabilityContainers)) OF UE-CapabilityRAT-Container
UE-CapabilityRAT-Container ::=      SEQUENCE {
    rat-Type                        RAT-Type,
    ue-CapabilityRAT-Container      OCTET STRING
}
-- TAG-UE-CAPABILITYRAT-CONTAINERLIST-STOP
-- ASN1STOP
```

Whether or not the UE 112 is allowed to send multiple capability profiles to the network may be indicated to the UE 112 by the network. For example, the network may indicate it with a flag in the UE 112. This option is shown below where the flag "allowMultipleProfiles-v15xy" is shown.

The UE 112 may, by default, apply a particular profile, i.e. unless otherwise stated the UE 112 applies a certain profile. This may be a profile associated with a certain index, for example the lowest index. It may be the first occurring profile.

In another aspect of the present disclosure, the UE 112 indicates existence of a second capability profile when sending capability information in the UECapabilityInformation message to the network. This secondary profile may be explicitly requested by the network. For example, the UE capability enquiry message may be extended so that the network can indicate whether the UE 112 is to send the primary capability set and/or the secondary capability set.

In another aspect of the present disclosure, a second capability profile may be sent in a separate message (e.g., a separate RRC message) compared to the primary capability profile. The UE 112 may indicate in the message if the capabilities that the UE 112 transfers are the primary or secondary UE capabilities. Or in general (in case this method would be applied to support more than two sets of capabilities), the UE 112 may indicate an identifier for the UE capabilities, for example an index which may be an integer value. The primary capabilities may have a default index, e.g. 0 or 1, and this index may be omitted in the UE capabilities. In other words, when the UE 112 sends the primary/default capabilities, the UE 112 does not indicate an index for them.

Whether or not the UE 112 has or supports a second capability profile may be indicated in legacy capability signaling information. This may be a one-bit flag which indicates that this UE 112 supports more than one capability profile. The network can then for such a UE request the additional capability profiles. Another approach is that the

```
                        UECapabilityEnquiry
        The UECapabilityEnquiry message is used to request UE radio
              access capabilities for NR as well as for other RATs.

Signalling radio bearer: SRB1
    RLC-SAP: AM
    Logical channel: DCCH
    Direction: Network to UE
                            UECapabilityEnquiry information element
-- ASN1START
-- TAG-UECAPABILITYENQUIRY-START
UECapabilityEnquiry ::=             SEQUENCE {
    rrc-TransactionIdentifier           RRC-TransactionIdentifier,
    criticalExtensions                  CHOICE {
        ueCapabilityEnquiry                 UECapabilityEnquiry-IEs,
        criticalExtensionsFuture            SEQUENCE { }
    }
}
UECapabilityEnquiry-IEs ::=         SEQUENCE {
    ue-CapabilityRAT-RequestList        UE-CapabilityRAT-RequestList,
    lateNonCriticalExtension            OCTET STRING
OPTIONAL,
    ue-CapabilityEnquiryExt             OCTET STRING (CONTAINING UECapabilityEnquiry-v1560-
IEs)  OPTIONAL
}
UECapabilityEnquiry-v1560-IEs ::=   SEQUENCE {
    capabilityRequestFilterCommon       UE-CapabilityRequestFilterCommon
OPTIONAL, -- Need N
    ue-CapabilityEnquiry-v15xy-IEs      UECapabilityEnquiry-v15xy-IEs           OPTIONAL
}
UECapabilityEnquiry-v15xy-IEs ::=   SEQUENCE {
    allowMultipleProfiles-v15xy         ENUMERATED {true}                       OPTIONAL,
    nonCriticalExtension                SEQUENCE { }                            OPTIONAL
}
-- TAG-UECAPABILITYENQUIRY-STOP
-- ASN1STOP
```

UE 112 indicates the number of capability profiles the UE 112 supports (this may be indicated as the number of additional profiles the UE supports in addition to the legacy/initial capability profile, or it may be indicated as the total number of capability profiles the UE supports).

In another aspect of the present disclosure, mechanisms that are used to signal overheating issues in the UE 112 are used to switch between different capability profiles. If a UE 112 supports X number of carriers in total, it would, if it only considers a single SIM, indicate that it supports X carriers (this in indicated in terms of supported band combinations and a number of carriers within each band in the band combinations). However, if the UE 112 in a multi-SIM scenario has to perform communication with respect to multiple SIMs, the UE 112 will have to share the UE resources (carriers, capabilities, processing, etc.) between these SIMs. According to this aspect of the present disclosure, the UE 112 may indicate towards the network with respect to a first SIM that, even if the capabilities indicate that it supports X carriers, the UE supports fewer carriers. This may then be indicated to the network using an overheating indication which tells the network that the UE 112 would require or prefer to use fewer carriers than the UE 112 is capable of. If the network associated with the first SIM responds by configuring fewer carriers for the UE 112, the UE 112 can use the spare carriers or resources for communication with the second SIM.

In another aspect of the present disclosure, if a UE 112 has sent more than one capability profile to the network, the UE 112 may switch between these profiles with a switching indication to the network. This may be preceded by a request from the UE 112 to switch UE capabilities. The UE 112 may, upon needing to connect with a second SIM and hence reserve resources for communication using that second SIM, change the capabilities related to the first SIM so that communication using the first SIM uses less resources.

In another aspect of the present disclosure, the network would reconfigure any connection that is not applicable with a new configuration within a duration that corresponds to a specific reconfiguration timer.

Figure 3:
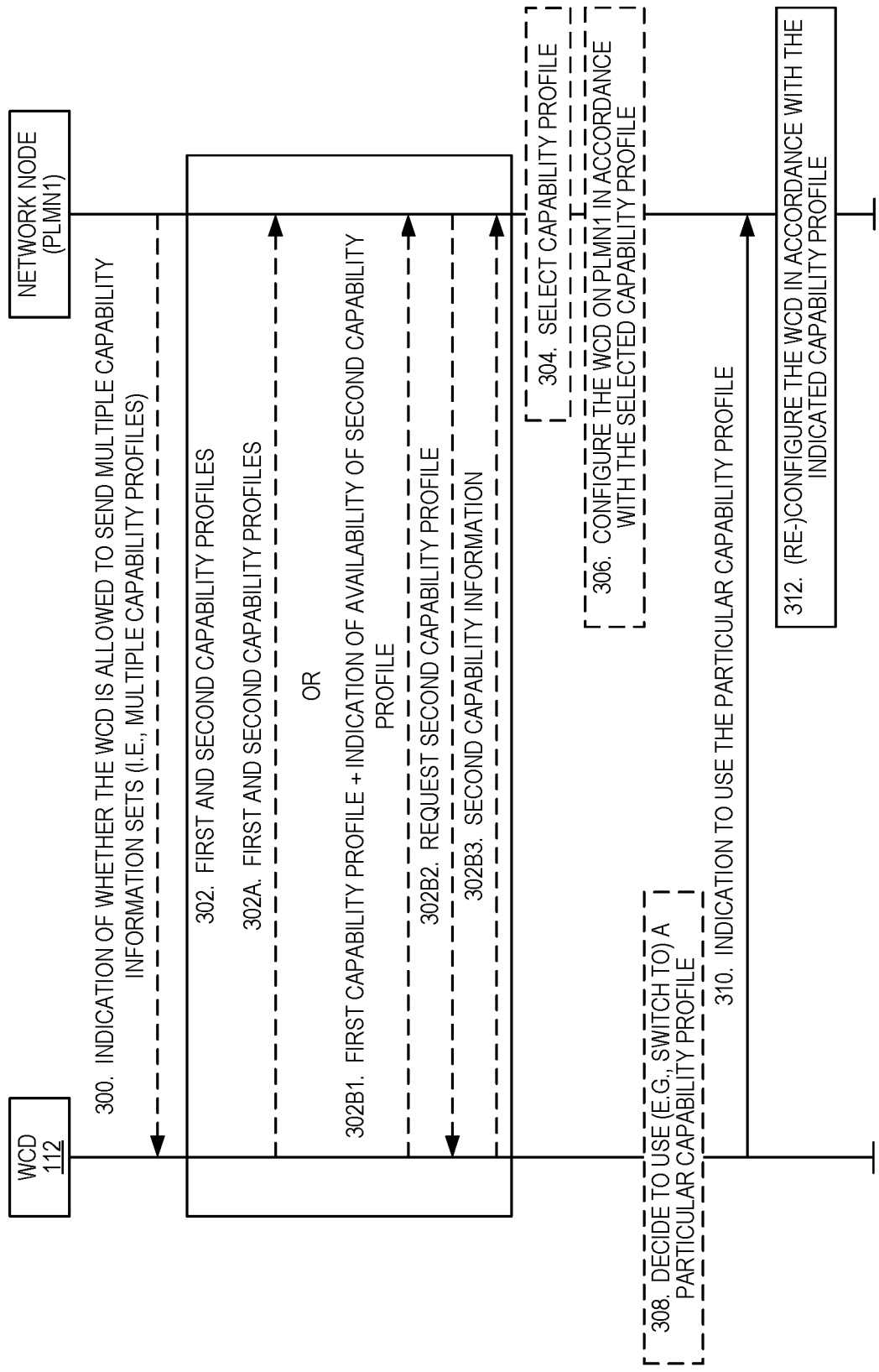
FIG. 3 illustrates the operation of a wireless communication device to provide two or more capability profiles to a network node in accordance with some embodiments of the present disclosure.

FIG. 3 illustrates the operation of a wireless communication device 112 in accordance with at least some aspects of the embodiments described above. The wireless communication device 112 is equipped with two or more SIMs (e.g., the wireless communication device 112 is a multi-SIM UE). Optional steps are represented by dashed lines/boxes. As illustrated, a network node (e.g., a base station 102) sends an indication to the wireless communication device 112 that indicates whether the wireless communication device 112 is allowed to send multiple capability information sets, as described above (step 300). These capability information sets are also referred to herein as capability profiles. The wireless communication device 112 sends a first capability profile and a second capability profile (e.g., a first capability profile, e.g., for use when using only a single SIM and a second capability profile, e.g., for use when using (e.g., simultaneous registrations) for two or more SIMs) to the network node, as described above (step 302). In one embodiment, the wireless communication device 112 sends the first and second capability profiles in the same message (step 302A). In another embodiment, the wireless communication device 112 sends the first and second capability profiles in separate messages. For example, in one embodiment, the wireless communication device 112 includes an indication in the first capability profile that indicates availability of the second capability profile (step 302B1). The network node may then request the second capability profile from the wireless communication device 112 (step 302B2), and the wireless communication device 112 then sends the second capability profile to the network node (step 302B3).

Optionally, the network node selects one of the capability profiles of the wireless communication device 112 (e.g., selects a default capability profile) (step 304) and configures the wireless communication device 112 in accordance with the selected capability profile (step 306), as described above.

Optionally, the wireless communication device 112 decides to use (e.g., switch to) a particular one of its capability profiles, as described above (step 308). For example, upon simultaneous registration with the PLMN associated with the network node and another PLMN, the wireless communication device 112 may decides to switch to a particular one of its capability profiles that takes into consideration that the other PLMN may also require, e.g., processing, features, in any situation when simultaneous communication with the two PLMNs is necessary/desired. The wireless communication device 112 sends an indication to the network node of a preference or request to switch to the particular capability profile (e.g., selected in step 308), as described above (step 310). In one embodiment, this indication is sent via an overheat indication. The network node re-configures the wireless communication device 112 in accordance with the indicated capability profile, as described above (step 312).

In another aspect of the present disclosure, a UE 112 request release from the network in order to update its capabilities. More specifically, the UE 112 is in Connected mode (RRC_CONNECTED) with regards to a PLMN A, and the UE 112 is registered towards another PLMN B for which the UE 112 is in Idle or Inactive mode. However, for some reason, the UE 112 may need to enter Connected mode with respect to PLMN B (e.g. arrival of data in the uplink buffer of the UE which should be sent via PLMN B, or based on paging of the UE in PLMN B). In such a case, resources in the UE 112 (e.g. RF-transceivers, processing, etc.) which currently are assigned for communication with PLMN A may need to be reallocated for communication with PLMN B. In such a situation, the UE 112 may send an indication to PLMN A indicating that the UE 112 suggests to the network to release the UE 112. When the UE 112 leaves Connected Mode with respect to PLMN A, the UE 112 may re-enter Connected with respect to PLMN A shortly thereafter and, when doing so, the UE 112 may indicate less capabilities towards PLMN A so that the UE 112 can reserve some resources for communication with PLMN B. This then allows the UE 112 to reallocate resources from PLMN A to PLMN B. Such indication may be a Release Assistance Info (RAI). The RAI may be enhanced to indicate further that the cause for sending the RAI is that the UE 112 intends to change its UE capabilities upon returning to the network.

Figure 4:
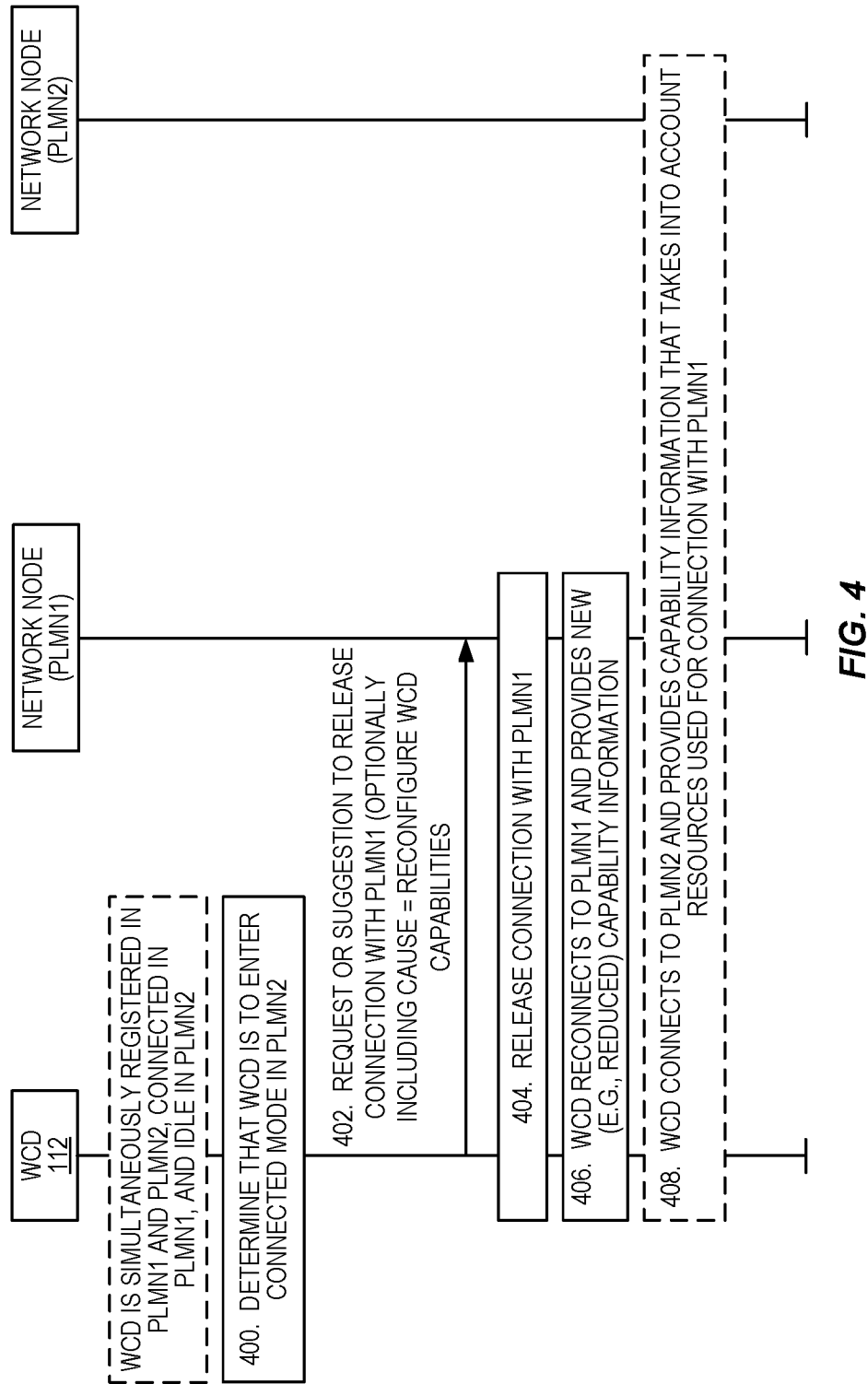
FIG. 4 illustrates the operation of a wireless communication device to request or suggest a connection release in order to update capability information reported to that network in accordance with embodiments of the present disclosure.

FIG. 4 illustrates the operation of a wireless communication device 112 in accordance with at least some aspects of the embodiments described above. The wireless communication device 112 is equipped with two or more SIMs (e.g., the wireless communication device 112 is a multi-SIM UE). Optional steps are represented by dashed lines/boxes. Initially, in the example, the wireless communication device 112 is registered with a first PLMN (PLMN1) and a second PLMN (PLMN2), the wireless communication device 112 is in connected mode with PLMN1, and the wireless communication device 112 is in idle or inactive mode with PLMN2. As illustrated, the wireless communication device 112 determines that it is to enter connected mode in PLMN2, as discussed above (step 400). Upon making this determination, the wireless communication device 112 sends a request or suggestion to a network node associated with PLMN1 that it is to release the wireless communication device 112, as discussed above (402). For example, as discussed above, this indication may be profiled by enhanced RAI. The network node associated with the wireless communication device 112 releases the connection of the wireless communication device 112 with respect to PLMN1 (e.g., via an RRC Release procedure) (step 404). The wireless communication device 112 then re-connects to PLMN1 (e.g. via a RRC Resume procedure) and in association therewith indicates less capabilities towards PLMN1, as discussed above (step 406). In other words, the wireless communication device 112 indicates capabilities that take into consideration (e.g., reserve) resources needed for PLMN2. The wireless communication device 112 connects to PLMN2 and, in association therewith, indicates capabilities that take into consideration resources needed for PLMN1 (step 408).

Some aspects of this present disclosure can be implemented in the RRC protocol. The RRC protocol can be implemented in a cloud environment and hence parts of the present disclosure could be implemented in a cloud environment.

Figure 5:
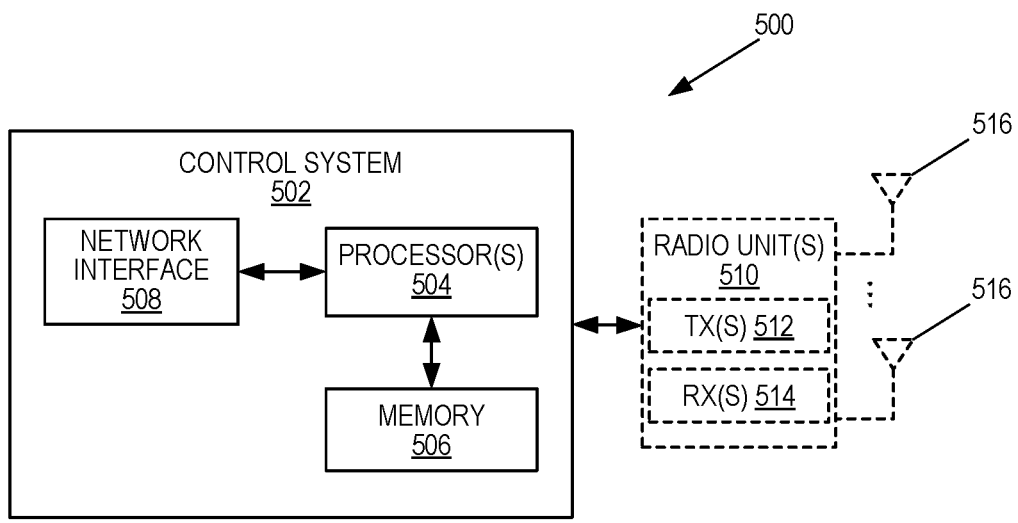
FIGS. 5 through 7 are schematic block diagrams of example embodiments of a network node.

FIG. 5 is a schematic block diagram of a network node 500 according to some embodiments of the present disclosure. Optional features are represented by dashed boxes. The network node 500 may be, for example, a radio access node such as, e.g., a base station 102 or 106 or a network node that implements all or part of the functionality of the base station 102, eNB, or gNB described herein or a core network node. As illustrated, the network node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, if the network node is a radio access node, the network node 500 may include one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of a network node as described herein. In some embodiments, the function(s) are implemented in software that is stored, e.g., in the memory 506 and executed by the one or more processors 504.

Figure 6:
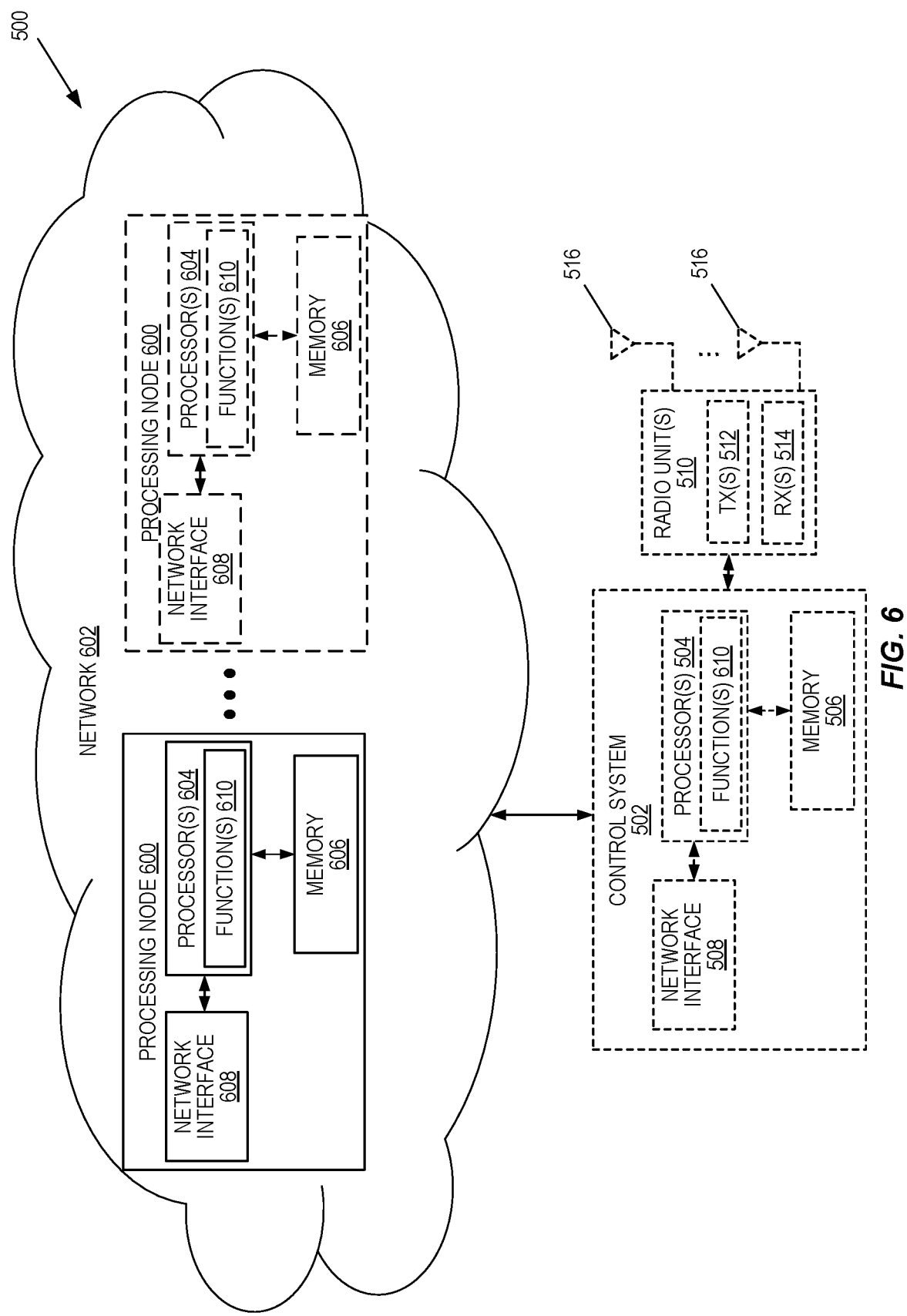

FIG. 6 is a schematic block diagram that illustrates a virtualized embodiment of the network node 500 according to some embodiments of the present disclosure. As used herein, a "virtualized" network node is an implementation of the network node 500 in which at least a portion of the functionality of the network node 500 is implemented as a virtual component(s) (e.g., via a virtual machine(s) executing on a physical processing node(s) in a network(s)). As illustrated, in this example, the network node 500 includes one or more processing nodes 600 coupled to or included as part of a network(s) 602. Each processing node 600 includes one or more processors 604 (e.g., CPUs, ASICs, FPGAs, and/or the like), memory 606, and a network interface 608. If the network node 500 is a radio access node, the network node 500 may include the control system 502 and/or the one or more radio units 510, as described above, which may be connected to the processing node(s) 600 via the network 602.

In this example, functions 610 of a network node described herein are implemented at the one or more processing nodes 600 or distributed across the one or more processing nodes 600 and the control system 502 and/or the radio unit(s) 510 in any desired manner. In some particular embodiments, some or all of the functions 610 of a network node described herein are implemented as virtual components executed by one or more virtual machines implemented in a virtual environment(s) hosted by the processing node(s) 600.

In some embodiments, a computer program including instructions which, when executed by at least one processor, causes the at least one processor to carry out the functionality of a network node (e.g., network node 500) or a node (e.g., a processing node 600) implementing one or more of the functions 610 of the a network node in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
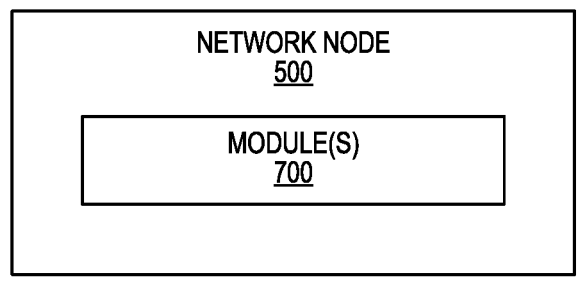

FIG. 7 is a schematic block diagram of the network node 500 according to some other embodiments of the present disclosure. The radio access node 500 includes one or more modules 700, each of which is implemented in software. The module(s) 700 provide the functionality of a network node described herein. This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

Figure 8:
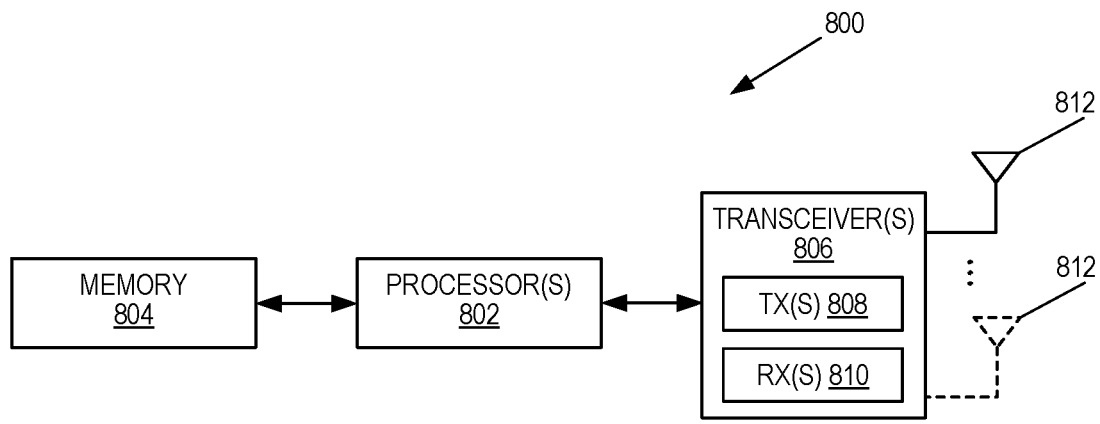
FIGS. 8 and 9 are schematic block diagrams of example embodiments of a wireless communication device.

FIG. 8 is a schematic block diagram of a wireless communication device 800 according to some embodiments of the present disclosure. As illustrated, the wireless communication device 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the wireless communication device 800 described above may be fully or partially implemented in software that is, e.g., stored in the memory 804 and executed by the processor(s) 802. Note that the wireless communication device 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the wireless communication device 800 and/or allowing output of information from the wireless communication device 800), a power supply (e.g., a battery and associated power circuitry), etc.

In some embodiments, a computer program including instructions which, when executed by at least one processor, causes the at least one processor to carry out the functionality of the wireless communication device 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
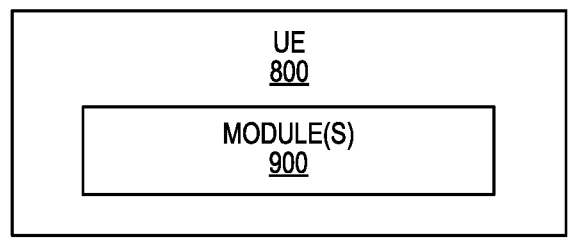

FIG. 9 is a schematic block diagram of the wireless communication device 800 according to some other embodiments of the present disclosure. The wireless communication device 800 includes one or more modules 900, each of which is implemented in software. The module(s) 900 provide the functionality of the wireless communication device 800 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device (112) having multiple Subscriber Identity Modules, SIMs, the method comprising one or more of the following: registering (202) with a first network associated with a first SIM; registering (204) with a second network associated with a second SIM; providing (206), to a network node associated with the first network, capability information for the wireless communication device (112) that takes into consideration resources that are or may be needed for communication on the second network such that the capability information indicates less than full capabilities of the wireless communication device (112).

Embodiment 2: The method of embodiment 1 wherein the capability information comprises information that indicates one or more of the following: a number of carriers supported by the wireless communication device (112); one or more carrier combinations supported by the wireless communication device (112); one or more processing capabilities of the wireless communication device (112); one or more features supported by the wireless communication device; a number of radio frontends that the wireless communication device (112) has; a bandwidth supported by the wireless communication device (112); a buffer or memory size supported by the wireless communication device (112); a number of PDN connections or PDU connections supported by the wireless communication device (112); one or more carrier aggregation related capabilities of the wireless communication device (112); or one or more dual connectivity related capabilities of the wireless communication device (112).

Embodiment 3: The method of embodiment 1 or 2 wherein the first network is a first PLMN, and the second network is a second PLMN.

Embodiment 4: The method of any of embodiments 1 to 3 further comprising: obtaining (200) a configuration of one or more services for which the first network is to be used by the wireless communication device (112) and/or a configuration of one or more services for which the second network is to be used by the wireless communication device (112); wherein the capability information provided to the network node associated with the first network takes into consideration the one or more services for which the first network is to be used by the wireless communication device (112) and/or the one or more services for which the second network is to be used by the wireless communication device (112).

Embodiment 5: The method of any of embodiments 1 to 4 wherein the first and second networks are different networks.

Embodiment 6: The method of any of embodiments 1 to 4 wherein the first and second networks are the same network.

Embodiment 7: A method performed by a wireless communication device (112), the method comprising one or more of the following: providing (302), to a network node associated with a first network, two or more capability profiles for the wireless communication device (112); and providing (310), to the network node, an indication to use a particular one of the two or more capability profiles for the wireless communication device (112).

Embodiment 8: The method of embodiment 7 wherein providing (302) the two or more capability profiles to the network node comprises providing (302A) the two or more capability profiles to the network node via a same message.

Embodiment 9: The method of embodiment 7 wherein providing (302) the two or more capability profiles to the network node comprises providing (302B1, 302B3) the two or more capability profiles to the network node via separate messages.

Embodiment 10: The method of embodiment 7 wherein providing (302) the two or more capability profiles to the network node comprises: providing (302B1) a first capability profile of the wireless communication device (112) to the network node together with an indication that one or more additional capability profiles for the wireless communication device (112) are available; receiving (302B2), from the network node, a request for at least one of the one or more additional capability profiles for the wireless communication device (112); and providing (302B3), to the network node in response to the request, the at least one of the one or more additional capability profiles for the wireless communication device (112).

Embodiment 11: The method of any of embodiments 7 to 10 further comprising receiving (300) an indication that the wireless communication device (112) is allowed to provide multiple capability profiles to the network.

Embodiment 12: The method of any of embodiments 7 to 11 further comprising: deciding (308) to use the particular one of the two or more capability profiles for the wireless communication device (112); wherein providing (310) the indication to use the particular one of the two or more capability profiles for the wireless communication device (112) comprises providing (310) the indication to use the particular one of the two or more capability profiles for the wireless communication device (112) upon deciding (308) to use the particular one of the two or more capability profiles for the wireless communication device (112).

Embodiment 13: The method of any of embodiments 7 to 12 wherein the indication is an overheat indication.

Embodiment 14: The method of any of embodiments 7 to 13 wherein the two or more capability profiles comprises a first capability profile and a second capability profile, the second capability profile being indicative of reduced capabilities as compared to the first capability profile.

Embodiment 15: The method of any of embodiments 7 to 14 wherein each capability profile of the two or more capability profiles comprises information that indicates one or more of the following: a number of carriers supported by the wireless communication device (112); one or more carrier combinations supported by the wireless communication device (112); one or more processing capabilities of the wireless communication device (112); one or more features supported by the wireless communication device; a number of radio frontends that the wireless communication device (112) has; a bandwidth supported by the wireless communication device (112); a buffer or memory size supported by the wireless communication device (112); a number of PDN connections or PDU connections supported by the wireless communication device (112); one or more carrier aggregation related capabilities of the wireless communication device (112); or one or more dual connectivity related capabilities of the wireless communication device (112).

Embodiment 16: A method performed by a wireless communication device (112) that is simultaneously registered with a first network and a second network, in connected mode with respect to the first network, and in idle mode with respect to the second network, the method comprising one or more of the following: determining (400) that the wireless communication device (112) is to connect to the second network; sending (402), to a network node associated with the first network, a request or suggestion to release a connection of the wireless communication device (112) with the first network; receiving (W304), from the network node associated with the first network, a request to release the connection of the wireless communication device (112) with the first network; reconnecting (406) with the first network; providing (406), to a network node associated with the first network, capability information that takes into consideration resources to be used for a connection with the second network.

Embodiment 17: The method of embodiment 16 wherein the request or suggestion to release the connection comprises release assistance information.

Embodiment 18: The method of claim 17 wherein the release assistance information comprises an indication that the wireless communication device (112) intends to change its capabilities upon reconnecting to the first network.

Embodiment 19: The method of any of embodiments 16 to 18 wherein the first network is a first PLMN associated with a first SIM of the wireless communication device (112), and the second network is a second PLMN associated with a second SIM of the wireless communication device (112).

Group B Embodiments

Embodiment 20: A method performed by a network node (e.g., base station), the method comprising: receiving (302), from a wireless communication device (112), two or more capability profiles for the wireless communication device (112); and receiving (310), from the wireless communication device (112), an indication to use a particular one of the two or more capability profiles for the wireless communication device (112).

Embodiment 21: The method of embodiment 20 wherein receiving (302) the two or more capability profiles comprises receiving (302A) the two or more capability profiles via a same message.

Embodiment 22: The method of embodiment 20 wherein receiving (302) the two or more capability profiles comprises receiving (302B1, 302B3) the two or more capability profiles via separate messages.

Embodiment 23: The method of embodiment 20 wherein receiving (302) the two or more capability profiles comprises: receiving (302B1) a first capability profile of the wireless communication device (112) to the network node together with an indication that one or more additional capability profiles for the wireless communication device (112) are available; sending (302B2), to the wireless communication device (112), a request for at least one of the one or more additional capability profiles for the wireless communication device (112); and receiving (302B3), from the wireless communication device (112) in response to the request, the at least one of the one or more additional capability profiles for the wireless communication device (112).

Embodiment 24: The method of any of embodiments 20 to 23 further comprising providing (300), to the wireless communication device (112), an indication that the wireless communication device (112) is allowed to provide multiple capability profiles to the network.

Embodiment 25: The method of any of embodiments 20 to 24 further comprising: (re)configuring (312) the wireless communication device (112) in accordance with the particular one of the two or more capability profiles for the wireless communication device (112).

Embodiment 26: The method of any of embodiments 20 to 25 wherein the indication is an overheat indication.

Embodiment 27: The method of any of embodiments 20 to 26 wherein the two or more capability profiles comprises a first capability profile and a second capability profile, the second capability profile being indicative of reduced capabilities as compared to the first capability profile.

Embodiment 28: The method of any of embodiments 20 to 27 wherein each capability profile of the two or more capability profiles comprises information that indicates one or more of the following: a number of carriers supported by the wireless communication device (112); one or more carrier combinations supported by the wireless communication device (112); one or more processing capabilities of the wireless communication device (112); one or more features supported by the wireless communication device; a number of radio frontends that the wireless communication device (112) has; a bandwidth supported by the wireless communication device (112); a buffer or memory size supported by the wireless communication device (112); a number of PDN connections or PDU connections supported by the wireless communication device (112); one or more carrier aggregation related capabilities of the wireless communication device (112); or one or more dual connectivity related capabilities of the wireless communication device (112).

Group C Embodiments

Embodiment 29: A wireless communication device comprising: processing circuitry configured to perform any of the steps of any of the Group A embodiments; and power supply circuitry configured to supply power to the wireless communication device.

Embodiment 30: A base station comprising: processing circuitry configured to perform any of the steps of any of the Group B embodiments; and power supply circuitry configured to supply power to the base station.

Embodiment 31: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless communication device that is simultaneously registered with a first network and a second network, in connected mode with respect to the first network, and in idle or inactive mode with respect to the second network, the method comprising:
   determining that the wireless communication device is to connect to the second network;
   sending, to a network node associated with the first network, a request or suggestion to release a connection of the wireless communication device with the first network;
   receiving, from the network node associated with the first network, a request to release the connection of the wireless communication device with the first network;
   reconnecting with the first network; and
   providing, to a network node associated with the first network, capability information associated with a reconnection to the first network that is based on resources to be used for a connection with the second network.

2. The method of claim 1 wherein the request or suggestion to release the connection comprises release assistance information.

3. The method of claim 2 wherein the release assistance information comprises an indication that the wireless communication device intends to change its capabilities upon reconnecting to the first network.

4. The method of claim 1 wherein the first network is a first PLMN associated with a first SIM of the wireless communication device, and the second network is a second PLMN associated with a second SIM of the wireless communication device.

5. A wireless communication device comprising:
   one or more transmitters;
   one or more receivers; and
   processing circuitry associated with the one or more transmitters and the one or more receivers, the processing circuitry configured to cause the wireless communication device to, when simultaneously registered with a first network and a second network, in connected mode with respect to the first network, and in idle or inactive mode with respect to the second network:
   determine that the wireless communication device is to connect to the second network;
   send, to a network node associated with the first network, a request or suggestion to release a connection of the wireless communication device with the first network;

receive, from the network node associated with the first network, a request to release the connection of the wireless communication device with the first network;

reconnect with the first network; and provide, to a network node associated with the first network, capability information associated with a reconnection to the first network that is based on resources to be used for a connection with the second network.

6. The wireless communication device of claim 5, wherein the request or suggestion to release the connection comprises release assistance information.

7. The wireless communication device of claim 6, wherein the release assistance information comprises an indication that the wireless communication device intends to change its capabilities upon reconnecting to the first network.

8. The wireless communication device of claim 5, wherein the first network is a first PLMN associated with a first SIM of the wireless communication device, and the second network is a second PLMN associated with a second SIM of the wireless communication device.

9. A method performed by a network node for a cellular communications system, the method comprising:

providing, to a wireless communication device, a message comprising an indication that the wireless communication device is allowed to send multiple capability profiles;

in response to providing the message, receiving, from the wireless communication device, two or more capability profiles for the wireless communication device; and receiving, from the wireless communication device, an indication to use a particular one of the two or more capability profiles for the wireless communication device.

10. The method of claim 9 wherein receiving the two or more capability profiles comprises receiving the two or more capability profiles via a same message.

11. The method of claim 10 wherein receiving the two or more capability profiles comprises receiving the two or more capability profiles via separate messages.

12. The method of claim 10 wherein receiving the two or more capability profiles comprises:

receiving a first capability profile of the wireless communication device together with an indication that one or more additional capability profiles for the wireless communication device are available;

sending, to the wireless communication device, a request for at least one of the one or more additional capability profiles for the wireless communication device; and receiving, from the wireless communication device in response to the request, the at least one of the one or more additional capability profiles for the wireless communication device.

13. The method of claim 10, further comprising providing, to the wireless communication device, an indication that the wireless communication device is allowed to provide multiple capability profiles to the network.

14. The method of claim 10, further comprising:

configuring the wireless communication device in accordance with the particular one of the two or more capability profiles for the wireless communication device.

15. The method of claim 10, wherein the indication is an overheat indication.

16. The method of claim 10, wherein the two or more capability profiles comprises a first capability profile and a second capability profile, the second capability profile being indicative of reduced capabilities as compared to the first capability profile.

17. The method of claim 10, wherein each capability profile of the two or more capability profiles comprises information that indicates:

(a) a number of carriers supported by the wireless communication device;

(b) one or more carrier combinations supported by the wireless communication device;

(c) one or more processing capabilities of the wireless communication device;

(d) one or more features supported by the wireless communication device;

(e) a number of radio frontends that the wireless communication device has;

(f) a bandwidth supported by the wireless communication device;

(g) a buffer or memory size supported by the wireless communication device;

(h) a number of PDN connections or PDU connections supported by the wireless communication device;

(i) one or more carrier aggregation related capabilities of the wireless communication device;

(j) one or more dual connectivity related capabilities of the wireless communication device; or any two or more of (a)-(j).

18. A network node for a cellular communications system, the network node comprising processing circuitry configured to cause the network node to:

provide, to a wireless communication device, a message comprising an indication that the wireless communication device is allowed to send multiple capability profiles;

in response to providing the message, receive, from the wireless communication device, two or more capability profiles for the wireless communication device; and receive, from the wireless communication device, an indication to use a particular one of the two or more capability profiles for the wireless communication device.

* * * * *